(12) United States Patent
Bai et al.

(10) Patent No.: US 8,376,109 B2
(45) Date of Patent: Feb. 19, 2013

(54) LEVER APPLIED DRY CLUTCH

(75) Inventors: Shushan Bai, Ann Arbor, MI (US);
Clinton E. Carey, Highland, MI (US);
Vijay A. Neelakantan, Rochester Hills,
MI (US); James M. Hart, Belleville, MI
(US); Leonid Basin, Farmington Hills,
MI (US)

(73) Assignee: GM Global Technology Operations LLC, Detroit, MI (US)

( * ) Notice: Subject to any disclaimer, the term of this patent is extended or adjusted under 35 U.S.C. 154(b) by 491 days.

(21) Appl. No.: 12/696,822

(22) Filed: Jan. 29, 2010

(65) Prior Publication Data

US 2011/0186399 A1 Aug. 4, 2011

(51) Int. Cl.
*F16D 21/06* (2006.01)

(52) U.S. Cl. .................. 192/48.91; 192/48.8; 192/70.3; 192/99 A

(58) Field of Classification Search .......... None
See application file for complete search history.

(56) References Cited

U.S. PATENT DOCUMENTS

| 4,360,091 A * | 11/1982 | Sada et al. | 192/48.8 |
| 6,390,265 B1 * | 5/2002 | Weydmann | 192/48.8 |
| 7,686,147 B2 * | 3/2010 | Friedmann et al. | 192/48.8 |

* cited by examiner

*Primary Examiner* — Rodney Bonck

(57) ABSTRACT

A dual clutch assembly includes a housing, an actuation member rotationally coupled with the housing, a first member coaxial with the housing, and a second member coaxial with the first member. A first clutch includes a first plate connected with the actuation member and a second plate connected for common rotation with the first member. A second clutch includes a first plate connected with the housing and a second plate connected for common rotation with the second member. At least one first lever is pivotally coupled to the housing. The first lever is pivotable to contact the actuation member thereby translating the actuation member and the first plate towards the second plate in order to engage the first clutch. The second lever is pivotable to contact the first plate of the second clutch and translate the first plate towards the second plate in order to engage the second clutch.

25 Claims, 8 Drawing Sheets

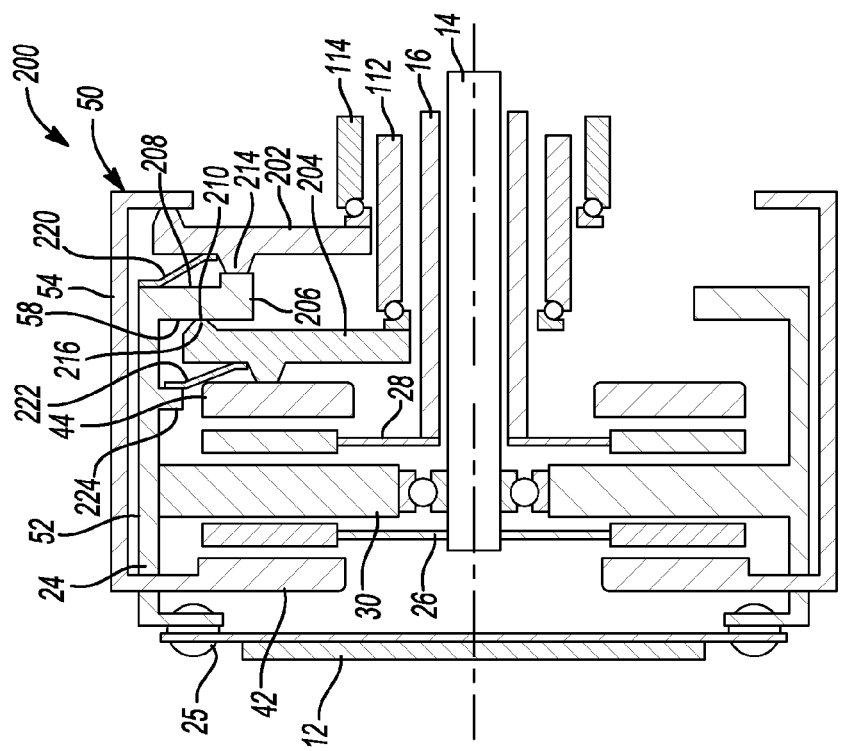
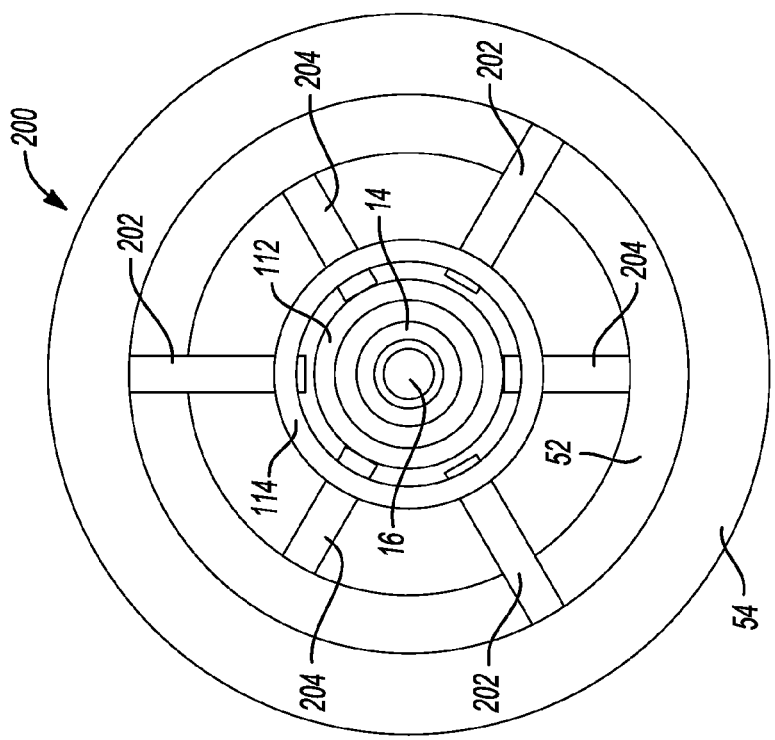

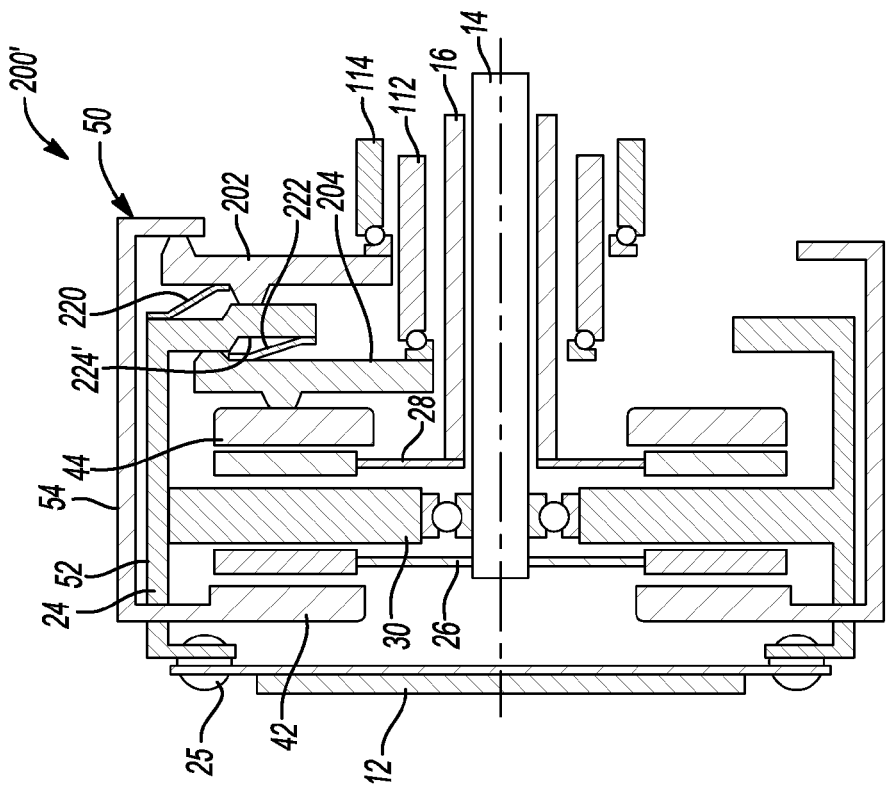
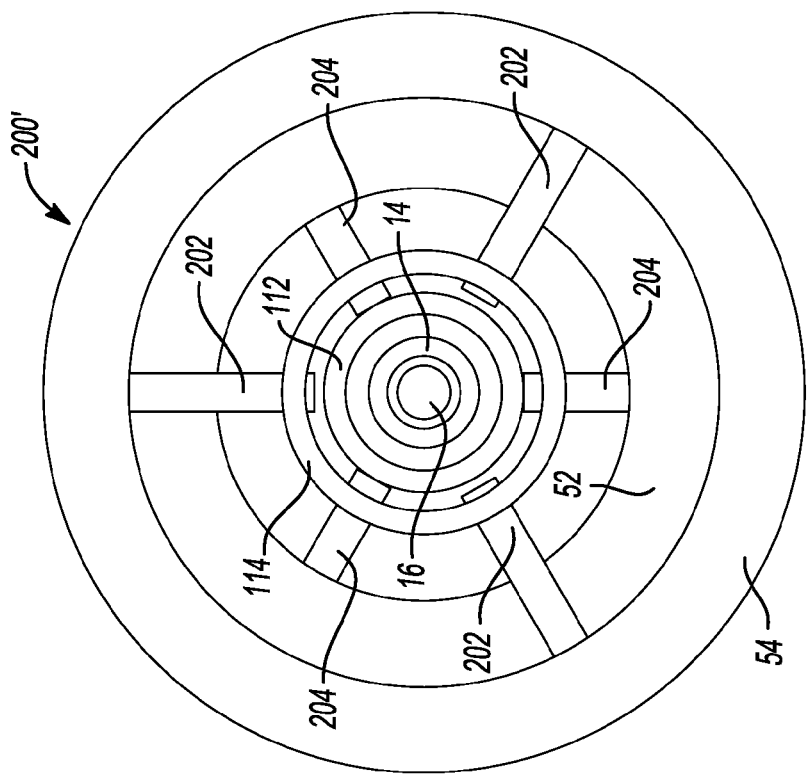

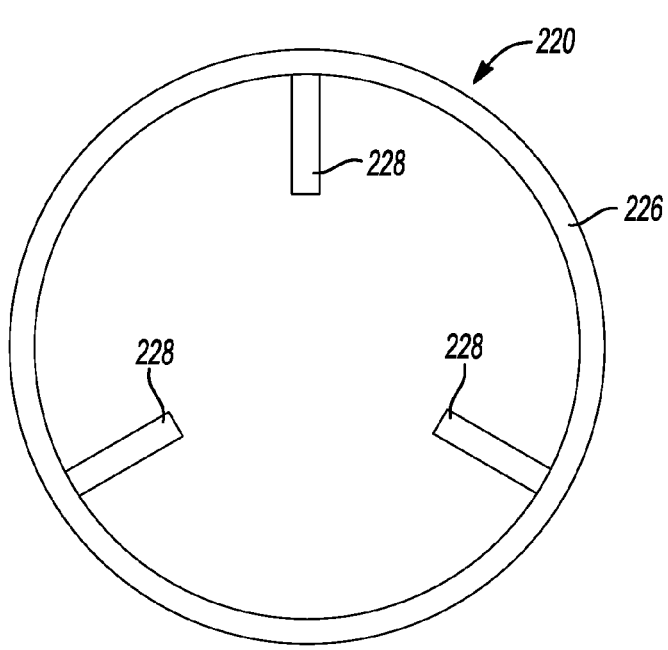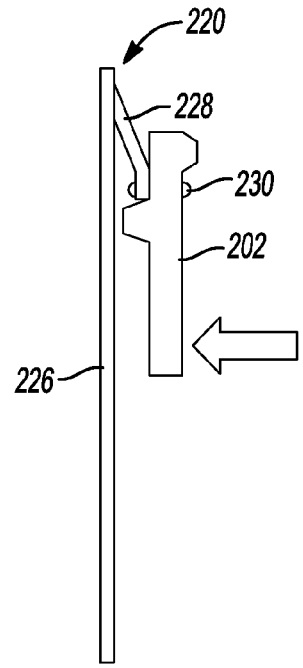
Fig-7A  Fig-7B
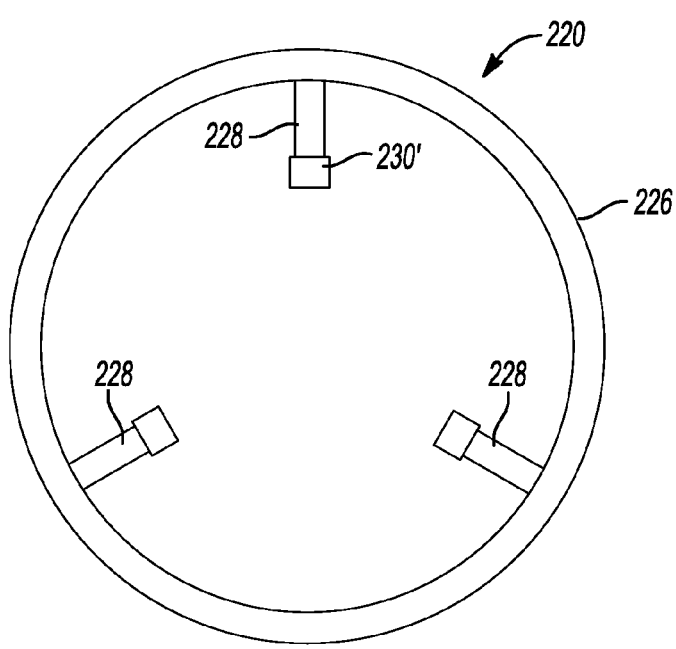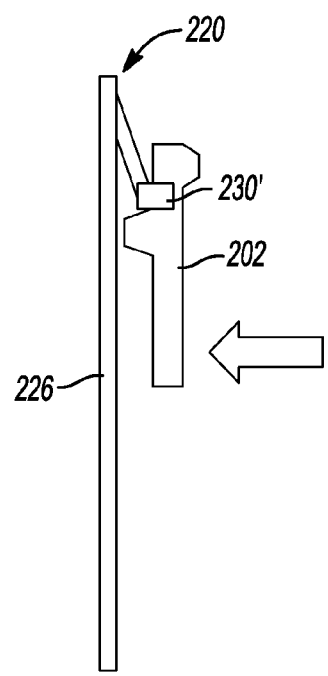
Fig-8A  Fig-8B

LEVER APPLIED DRY CLUTCH

FIELD

The invention relates generally to a lever applied dry clutch, and more particularly to a rigid lever applied dry dual clutch in a transmission.

BACKGROUND

The statements in this section merely provide background information related to the present disclosure and may or may not constitute prior art.

A typical multi-speed automatic transmission uses a combination of torque transmitting devices, such as clutches or brakes, to achieve a plurality of forward and reverse gear or speed ratios as well as a Neutral and a Park. Selection of speed ratios is typically accomplished by a microprocessor transmission control module that employs various vehicle parameters, for example vehicle speed, and various driver input signals, for example accelerator pedal position, to select the appropriate speed ratios. The transmission then engages a combination of the toque transmitting devices to provide the desired speed ratios.

One type of automatic transmission is the dual clutch transmission. The dual clutch transmission includes a dual clutch that selects between even gear ratios and odd gear ratios. Dual clutches may be either wet or dry. Dry dual clutches are actuated using diaphragm springs, i.e. compliant levers. If the levers are compliant, the stroke required at the clutch is multiplied by the compliant lever and the multiplication factor is a function of the lever ratio and the compliance of the lever. Hence the resultant stroke to be produced at the lever actuation point is high. When this actuation is controlled by a hydraulic system, the required volume of fluid required is also high since the actuation stroke is high. It is well known that when the fluid flow is very high, it can be difficult to accurately control the fluid pressure simultaneously. In addition, the force at the clutch and the torque transmitted through the clutch can be related to the position of the lever actuation point. Therefore, in a compliant lever system, the hydraulic actuation is controlled by a closed loop position control system using position sensors at the actuation point and flow control solenoids. These components make the system expensive and complicated. Therefore, there is room in the art for a dual clutch actuation system that offers pressure control at the actuation point, that reduces the variation between pressure commanded and the force that is actually applied to the clutches thereby providing more precise control, that increases the response time of the system by eliminating flexible springs or diaphragms that add dynamic delays to the system, and that eliminates the need for closed loop pressure control.

SUMMARY

A dual clutch assembly having rigid levers according to the principles of the present invention is provided. In one example, the dual clutch has a housing that defines an axis, an actuation member rotationally coupled with the housing, a first member coaxial with the housing, and a second member coaxial with the first member. A first clutch includes a first plate connected for common rotation with the actuation member and a second plate connected for common rotation with the first member. A second clutch includes a first plate connected for common rotation with the housing and a second plate connected for common rotation with the second member. At least one first lever is pivotally coupled to the housing. The first lever is pivotable to contact the actuation member to move the actuation member and the first plate of the first clutch to a position in contact with the second plate of the first clutch. At least one second lever is pivotally coupled to the housing. The second lever is pivotable to contact the first plate of the second clutch to move the first plate of the second clutch to a position in contact with the second plate of the second clutch.

In one example of the dual clutch assembly, the housing includes at least one first pivot point and at least one second pivot point, wherein the first lever is pivotally coupled to the first pivot point and the second lever is pivotally coupled to the second pivot point.

In another example of the dual clutch assembly, the first pivot point is disposed on an inner radial surface of the housing and the second pivot point is disposed on an inner axial surface of the housing.

In yet another example of the dual clutch assembly, the first pivot point is disposed on an outer radial surface of the housing and the second pivot point is disposed on an inner radial surface of the housing.

In another example of the dual clutch assembly, a first return spring for moving the first lever to an unengaged position and a second return spring for moving the second lever to an unengaged position is included.

In another example of the dual clutch assembly, the first return spring is disposed between the outer radial surface of the housing and the first lever and the second return spring is disposed between a projection extending from an axial inner surface of the housing and the second lever.

In another example of the dual clutch assembly, the first return spring is disposed between the outer radial surface of the housing and the first lever and the second return spring is disposed between the inner radial surface of the housing and the second lever.

In another example of the dual clutch assembly, the first return spring includes a ring portion and at least one axially and radially inwardly extending spring arm, wherein the spring arm is coupled to the first lever, and wherein the second return spring includes a ring portion and at least one axially and radially inwardly extending spring arm, and wherein the spring arm is coupled to the second lever.

In another example of the dual clutch assembly, the first return spring is coupled to the first lever by a pin connection or by a clip connection.

In another example of the dual clutch assembly, the actuation member is disposed around the housing and the actuation member is axially translatable relative to the housing and rotationally coupled to the housing.

In another example of the dual clutch assembly, the first lever includes a pivot portion pivotally connected to the housing, a first end located radially inwardly of the pivot portion, and a second end located radially outwardly of the pivot portion, wherein the second end contacts the actuation member when the first lever is pivoted to an engaged position.

In another example of the dual clutch assembly, the second lever includes a pivot portion pivotally connected to the housing, a first end located radially inwardly of the pivot portion, and a contact surface disposed between the pivot portion and the first end, wherein the contact surface contacts the first plate of the second clutch when the second lever is pivoted to an engaged position.

In another example of the dual clutch assembly, the first lever is pivoted to the engaged position by an actuation device in alignment with the first end of the first lever and the second lever is pivoted to the engaged position by an actuation device in alignment with the first end of the second lever.

In another example of the dual clutch assembly, the housing is annular and includes an axial inner surface that extends axially and a radial inner surface that extends radially inwardly, and the radial inner surface includes at least one opening that is in alignment with the second end of the first lever.

In another example of the dual clutch assembly, the actuation member is a sleeve disposed around the housing, and the actuation member includes at least one radial member that extends radially inwardly and is disposed adjacent the opening in the housing, and the second end of the first lever contacts the radial member of the actuation member when the first lever is pivoted to the engaged position, thereby slidably translating the actuation member in an axial direction and compressing the second friction plate of the first clutch with the first friction plate of the first clutch.

Further examples, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 5A is a side schematic view of another example of a dual clutch assembly according to the principles of the present invention;

FIG. 5B is an end schematic view of the dual clutch assembly shown in FIG. 5A;

FIG. 6A is a side schematic view of another example of a dual clutch assembly according to the principles of the present invention;

FIG. 6B is an end schematic view of the dual clutch assembly shown in FIG. 6A;

FIG. 7A is a front view of a retainer spring according to the principles of the present invention;

FIG. 7B is a side view of a portion of the retainer spring shown in FIG. 7A engaged with a portion of a dual clutch assembly according to the principles of the present invention;

FIG. 8A is a front view of another retainer spring according to the principles of the present invention;

FIG. 8B is a side view of a portion of the retainer spring shown in FIG. 8A engaged with a portion of a dual clutch assembly according to the principles of the present invention.

DETAILED DESCRIPTION

The following description is merely exemplary in nature and is not intended to limit the present disclosure, application, or uses.

Figure 1:
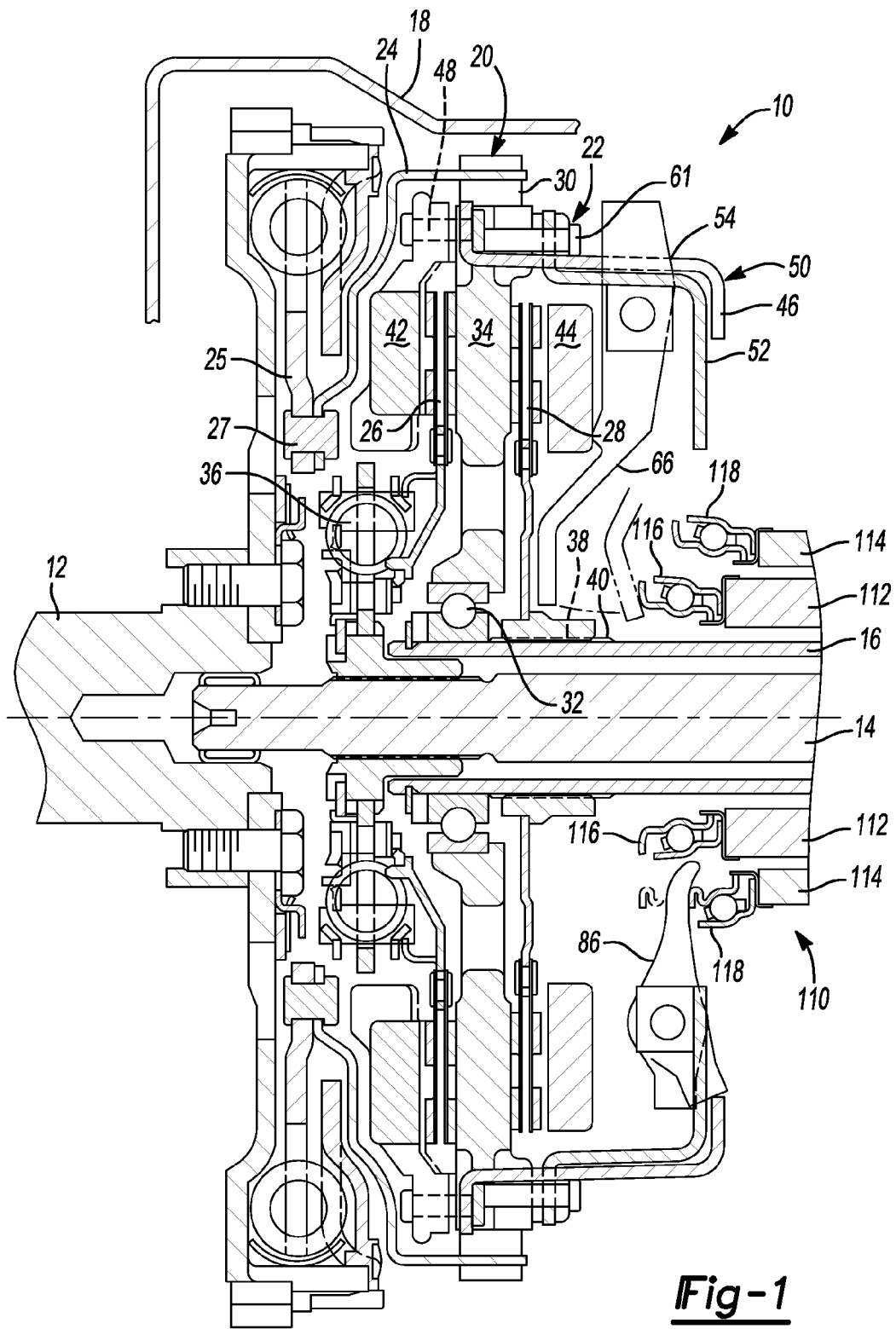
FIG. 1 is a cross-sectional view of an example of a dual clutch assembly according to the principles of the present invention.

With reference to FIG. 1, a torque transmitting device for a dual input transmission (not shown) is generally indicated by reference number 10. The torque transmitting device 10 is for example a dual clutch disposed in a vehicle powertrain. Typically the vehicle powertrain includes an engine and a transmission. In the instant embodiment the transmission is a dual input transmission where torque is transferred from the engine via a crankshaft 12 to two input shafts in the transmission: a first input shaft 14 and a second input shaft 16 through selective operation of the torque transmitting device 10. The second input shaft 16 is a sleeve (or hollow) shaft that is concentric with and overlies the first input shaft 14. The torque transmitting device 10 is disposed in a transmission housing or bell housing 18

The torque transmitting device 10 has two separate and independent friction clutches 20 and 22 disposed within a clutch housing or outer hub 24. The clutch housing or outer hub 24 is rotationally fixed to a flywheel 25 through a connecting member 27. The flywheel 25 is rotationally fixed to the crankshaft 12 and is preferably a dual mass flywheel that is configured to dampen and reduce vibration in the crankshaft 12.

The torque transmitting device 10 includes a central hub 30 rotationally connected with the outer hub 24. The central hub 30 is supported for rotation relative to the sleeve shaft 16 via a plurality of bearings 32. The central hub 30 includes a fixed friction plate 34. The friction plate 34 is fixed from movement in an axial direction.

The friction clutches 20 and 22 each include friction members 26 and 28, respectively. The friction member 26 is connected through a damper 36 to the input shaft 14. The friction member 28 is connected to the sleeve shaft 16 via a spline 38 and groove 40 connection. The friction members 26, 28 are disposed on either side of the axially fixed friction plate 34.

The friction clutches 20 and 22 also include axially moveable apply members 42 and 44, respectively. The apply members 42 and 44 are each selectively translatable in an axial direction to engage one of the friction members 22 and 24 in order to couple the crankshaft 12 with one of the input shafts 14 and 16. The apply members 42 and 44 are selectively actuated by a lever actuation assembly 50.

Figure 2:
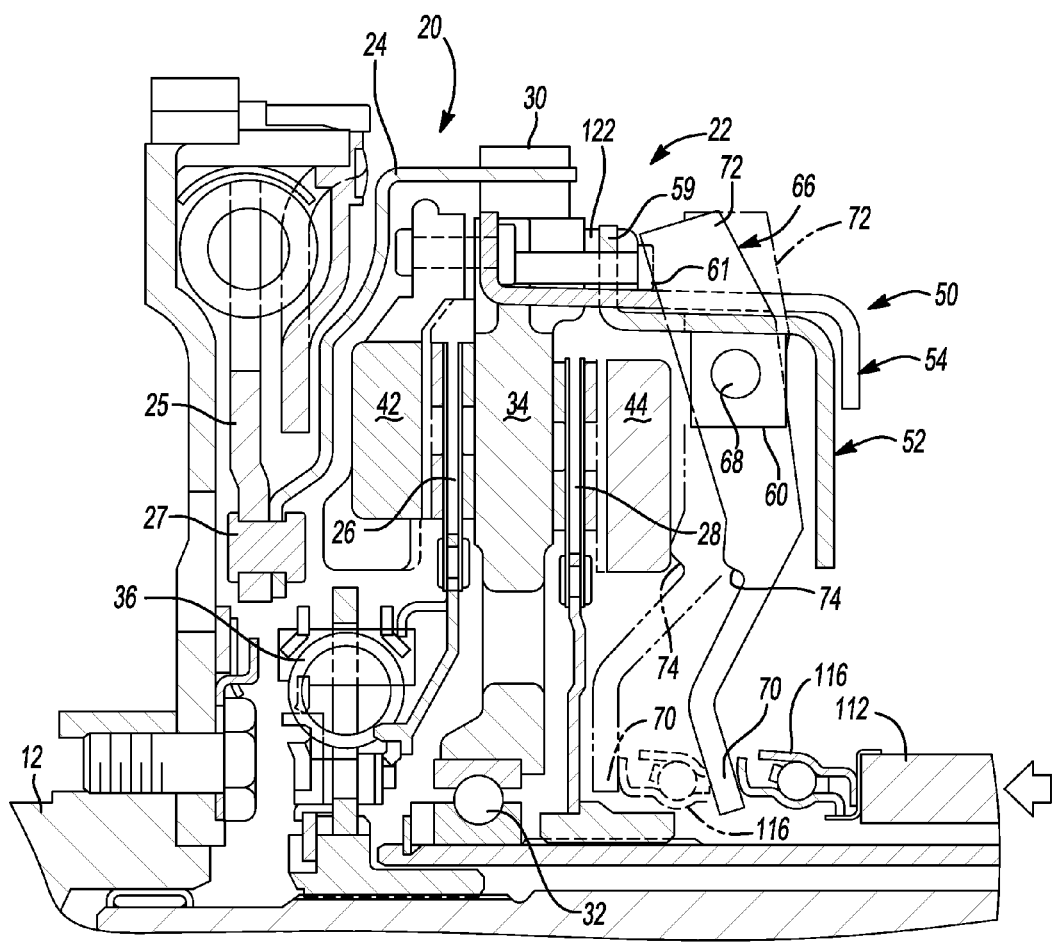
FIG. 2 is cross-sectional view of a portion of the dual clutch assembly shown in FIG. 1.
Figure 3:
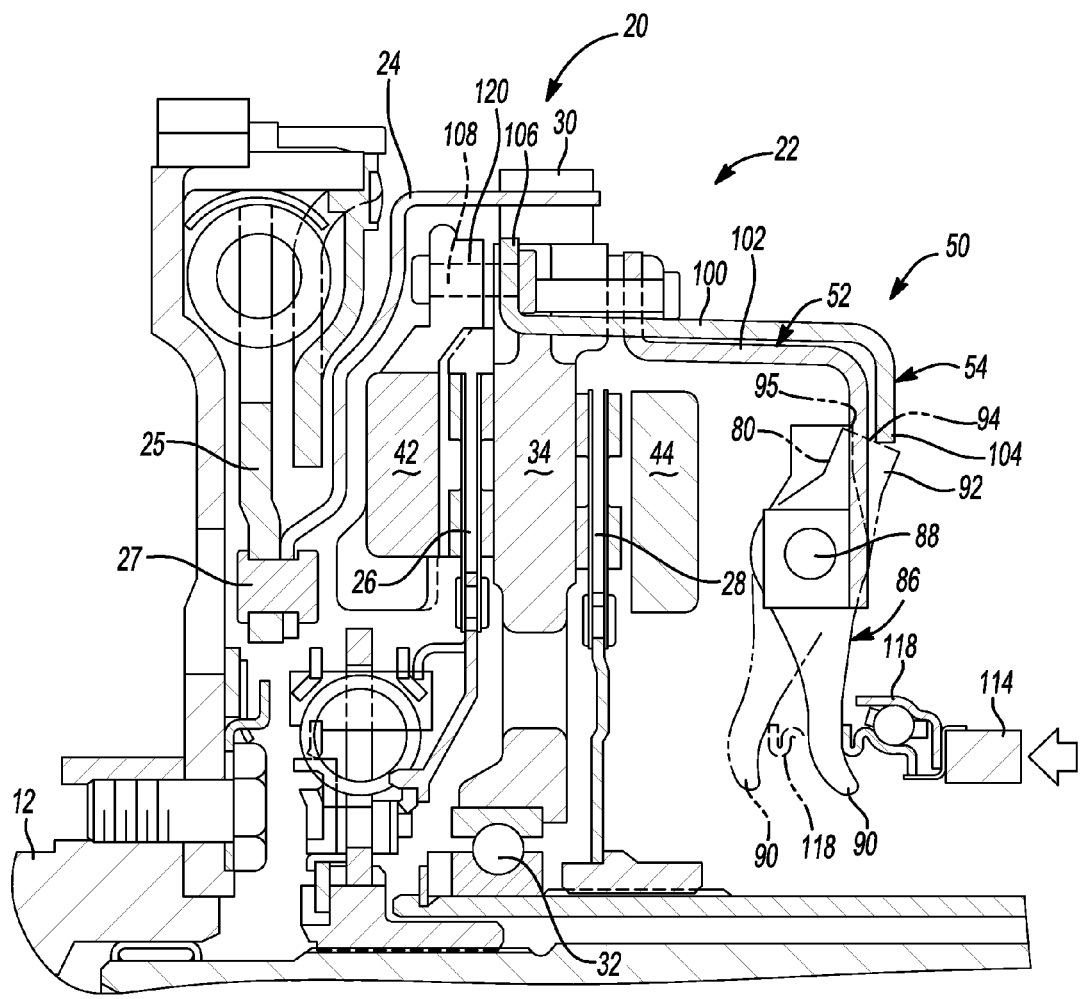
FIG. 3 is another cross-sectional view of a portion of the dual clutch assembly shown in FIG. 1.
Figure 4:
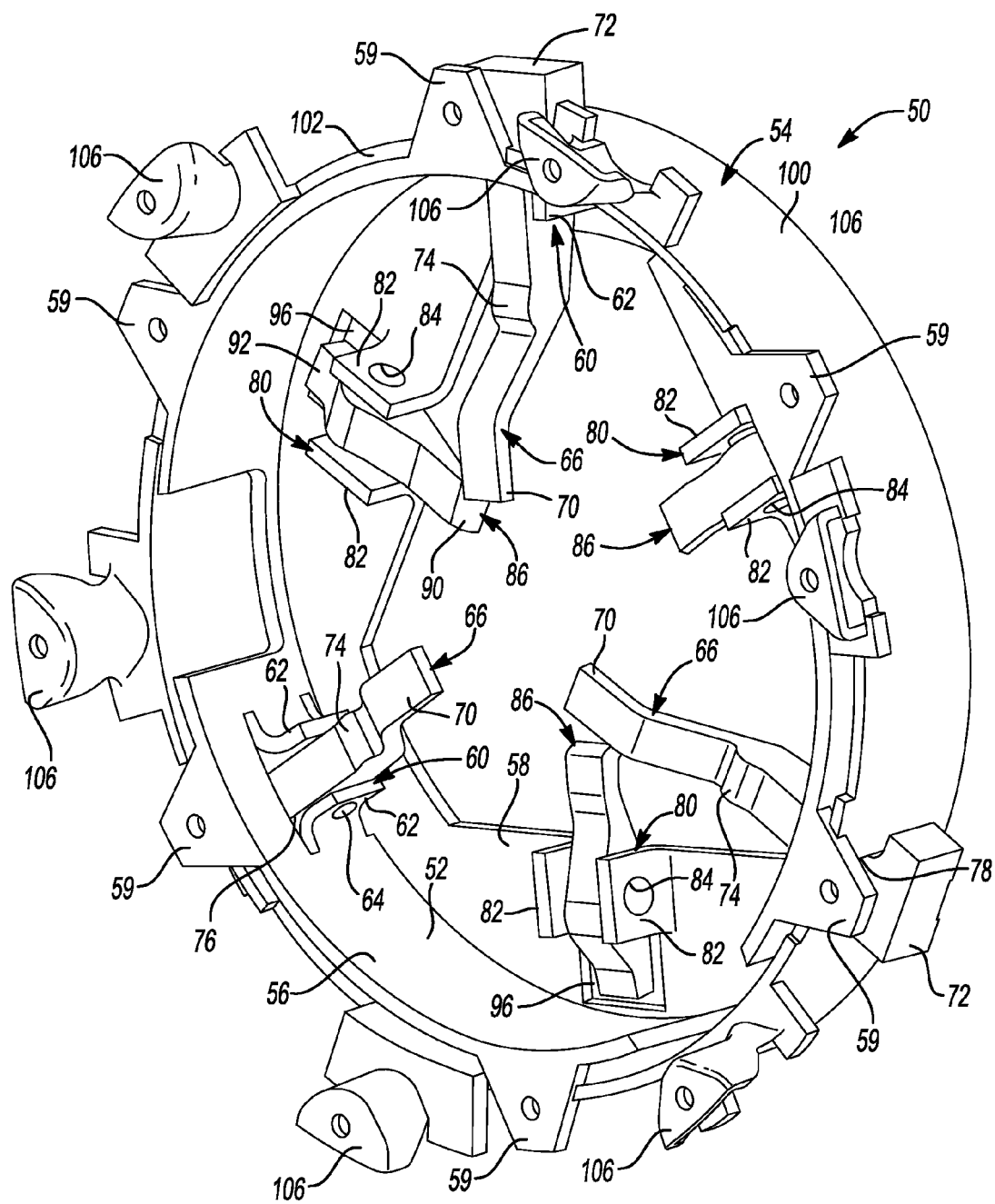
FIG. 4 is an isometric view of a clutch actuation assembly according to the principles of the present invention.

Turning to FIG. 4, and with continued reference to FIGS. 1-3, the lever actuation assembly 50 includes an inner lever housing 52 and an outer actuation sleeve 54. The lever housing 52 is annular and coaxial with the input shafts 14 and 16. The lever housing 52 includes an inner surface 56 that extends in an axial direction and an inner radial surface 58 that extends inwardly in a radial direction relative to the input shafts 14, 16. A plurality of tab members 59 extend radially outward from the lever housing 52. The tab members 59 are coupled to the central hub 30 via fasteners 61. The lever housing 52 is rotatable with the central hub 30 but is fixed from axial translation. The apply plate 44 is slidably mounted on the fasteners 61. Accordingly, the apply plate 44 is rotatable with the central hub 30 and lever housing 52 but is bi-directionally axially translatable, as will be described in greater detail below.

A plurality of first pivot points 60 are disposed on the inner surface 56 of the lever housing 52. In the example provided, there are three first pivot points 60 disposed equidistant around the inner surface 56, however it should be appreciated that any number of first pivot points 60 spaced in any number of ways may be employed without departing from the scope of the present invention. In the example provided, the first pivot points 60 each include two radially extending flanges 62 that are parallel to one another. Each flange 62 includes a hole 64 for receiving a fastener (not shown), such as a pin or bolt.

A first set of rigid levers 66 are disposed within the pivot points 60. Each rigid lever 66 is pivotally coupled to the lever housing 52 at one of the first pivot points 60 via the fasteners. It should be appreciated that other means of pivotally coupling or contacting the first rigid levers 66 to the pivot points 60 may be employed without departing from the scope of the present invention.

As best seen in FIGS. 2 and 4, the first rigid levers 66 include a body portion 68 pivotally connected to the pivot points 60. A first end 70 is disposed radially inward of the body portion 68 and a second end 72 is disposed radially outward of the body portion 68. The first rigid levers 66 include a contact surface 74 disposed between the first end 70 and the body portion 68. In the example provided, the contact surface 74 is a raised protrusion. The second ends 72 extend radially out from windows 76 in the lever housing 52 and through windows 78 disposed in the actuation sleeve 54. As will be described in greater detail below, the first rigid levers 66 are pivotable about the pivot points 60 so as to engage the apply member 44.

A plurality of second pivot points 80 are disposed on the radial inner surface 58 of the lever housing 52. In the example provided, there are three second pivot points 80 disposed equidistant around the radial inner surface 58, however it should be appreciated that any number of second pivot points 80 spaced in any number of ways may be employed without departing from the scope of the present invention. In the example provided, the second pivot points 80 each include two radially extending flanges 82 that are parallel to one another. Each flange 82 includes a hole 84 for receiving a fastener (not shown), such as a pin or bolt. A second set of rigid levers 86 are disposed within the pivot points 80. Each rigid lever 86 is pivotally coupled to the lever housing 52 at one of the second pivot points 80 via the fasteners. It should be appreciated that other means of pivotally coupling or contacting the second rigid levers 86 to the pivot points 80 may be employed without departing from the scope of the present invention.

As best seen in FIGS. 3 and 4, the second rigid levers 86 include a body portion 88 pivotally connected to the pivot points 60. A first end 90 is disposed radially inward of the body portion 88 and a second end 92 is disposed radially outward of the body portion 88. The second rigid levers 86 include a contact surface 94 disposed on the second end 92. In the example provided, the contact surface 94 is flat surface. The second ends 92 are aligned with openings 96 disposed in the inner radial surface 56 of the lever housing 52. When the second rigid levers 86 are pivoted about the pivot points 88, the second ends 92 extend out through the openings 96 in order to engage the actuation sleeve 54 and therefore engage the apply member 46, as will be described in greater detail below.

The actuation sleeve 54 is slidably disposed around the lever housing 52. The actuation sleeve 54 includes an axially extending sleeve portion 100 that is disposed overtop and in contact with an outer surface 102 of the lever housing 52. The actuation sleeve 54 is rotationally coupled to the lever housing 52, however, the actuation sleeve 54 is bi-directionally axially translatable relative to the lever housing 52. A plurality of first tab members 104 are disposed on one end of the actuation sleeve 54. The tab members 104 extend radially inward and are in alignment with the openings 96 in the lever housing 56 and therefore in alignment with the second rigid levers 86. A plurality of second tab members 106 are disposed on an opposite end of the actuation sleeve 54 from the first tab members 104. The tab members 106 extend radially outward and are connected to the apply member 42 via a connection 108.

Returning to FIGS. 1-3, the lever actuation assembly 50 is actuated by an actuation device 110. The actuation device 110 includes a pair of annular pistons 112 and 114 and a pair of annular bearing assemblies 116 and 118 connected with the annular pistons 112 and 114, respectively. The actuation assembly 50 is rotationally fixed relative to the housing 18. The annular pistons 112 and 114 are configured to slide axially within their housings when actuated by hydraulic fluid. The annular pistons 112 and 114 and the annular bearings 116 and 118 are radially aligned such that the annular piston 112 and the annular bearing 116 are engageable with the rigid levers 66 and the annular piston 114 and annular bearing 118 are engageable with the rigid levers 86. The bearing assemblies 116 and 118 are actuation bearings that torsionally decouple the rotating elements of the dual clutch 10 (i.e. the first and second rigid levers 66 and 86) from the non-rotating members of the actuation device 50 (i.e. the pistons 112 and 114).

With combined reference to FIGS. 1-4, the operation of the torque transmitting device 10 will now be described. Selective engagement through axial compression of apply member 42 with friction member 26 and friction plate 34 connects the crankshaft 12 for common rotation with the first input shaft 18. Selective engagement of apply member 44 with friction member 28 and friction plate 34 connects the crankshaft 12 for common rotation with the second input shaft 16. The number and size of the friction members and apply members will vary based on appropriate torque transmission requirements. Of course, the torque transmission capability of the torque transmitting device 10 may be varied by varying the number of friction members and amount of surface area of each friction element.

In order to engage the first friction clutch 20, hydraulic fluid is pressurized and forced through feed bores (not shown) in the annular piston 114 to push the annular piston 114 towards the torque transmitting device 10. More specifically, as the annular piston 114 moves axially, the bearing assembly 118 contacts the first ends 90 of the rigid levers 86. The bearing assembly 118 applies a force to the first ends 90 of the rigid levers 86. Accordingly, as the piston 114 translates axially towards the clutch 20, the rigid levers 86 pivot at the pivot points 80. As the rigid levers 86 pivot, the second end 92 moves away from the friction clutch 20, through the opening 96 of the lever housing 52, and contacts the tab members 104 of the actuation sleeve 54. The second ends 92 of the rigid levers 86 apply a force to the actuation sleeve 54 and the actuation sleeve 54 in turn translates away from the friction clutch 20. As the actuation sleeve 54 moves away from the friction member 26, the actuation sleeve 54 moves the apply member 42 to an engaged position (shown in dashed lines in FIG. 3) such that the apply member 42 is in contact with the friction member 26 (shown in dashed lines in FIG. 3). Compression of the friction member 26 between the apply member 42 and the friction plate 34 causes the friction member 26 to rotate at substantially the same speed as friction element 34. Thus, crankshaft 12 is selectively rotationally coupled through the outer hub 24, to the central hub 30, through the central hub 30 to the actuation assembly 50, through the actuation assembly 50 to the clutch 20, and through the clutch 20 to the first input shaft 14. When the annular piston 114 is depressurized or vented the force applied by a return spring 120 on the apply member 42 forces the apply member 42 and rigid levers 86 back to unengaged positions.

In order to engage the second friction clutch 22, hydraulic fluid is pressurized and forced through feed bores (not shown) in the annular piston 112 to push the annular piston 112 towards the torque transmitting device 10. More specifically, as the annular piston 112 moves axially, the bearing assembly 116 contacts the first ends 70 of the rigid levers 66. The bearing assembly 116 applies a force to the first ends 70 of the rigid levers 66. Accordingly, as the piston 112 translates axially towards the clutch 22, the rigid levers 66 pivot at the pivot points 60. As the rigid levers 66 pivot, the second end 72 moves towards the friction clutch 20 and eventually contacts the apply member 44 at the contact surfaces 74. The contact surfaces 74 of the rigid levers 66 apply a force to the apply member 44 and moves the apply member 44 to an engaged position such that the apply member 44 is in contact with the friction member 28. Compression of the friction member 28 between the apply member 44 and the friction plate 34 causes the friction member 28 to rotate at substantially the same speed as friction element 34. Thus, crankshaft 12 is selectively rotationally coupled through the outer hub 24, to the central hub 30, through the central hub 30 to the actuation assembly 50, through the actuation assembly 50 to the clutch 20, and through the clutch 22 to the second input shaft 16. When the annular piston 112 is depressurized or vented the force applied by a return spring 122 on the apply member 44 forces the apply member 44 and rigid levers 66 back to unengaged positions (shown in dashed lines in FIG. 2).

The resultant clutch torque and force at the clutches 20 and 22 are functions of the force at the actuation point of the rigid levers 66 and 86. Since the levers 66 and 86 are rigid, this actuation force is multiplied by the lever ratio inherent in each rigid lever 66 and 86 to achieve the clutch force. The actuation force is in turn directly proportional to the actuation fluid pressure. Therefore pressure control is sufficient to achieve actuation of the clutches 20 and 22. Pressure control is achieved by using pressure control solenoids (not shown) that are used in current production transmissions and could either be direct acting variable force solenoids (VFS) or a combination of Variable Bleed Solenoids (VBS) or Low flow VFS along with Pressure Regulating Valves. This system is known to be simple and cost effective as it does not require any special sensors.

Turning to FIGS. 5A and 5B, a schematic diagram of an alternate arrangement of the torque transmitting device 10 is generally indicated by reference number 200 and accordingly like components are indicated by like reference numbers. However, the torque transmitting device 200 includes a plurality of first rigid levers 202 and a plurality of second rigid levers 204. The rigid levers 202 and 204 operate in substantially the same manner as the rigid levers 66 and 86 described above, however, the rigid levers 202 and 204 are not directly pinned or connected at the pivot points 60 and 80. Instead, the rigid levers 202 are disposed between the lever housing 52 and the actuation sleeve 54. The rigid levers 202 pivot about a pivot point 206 located on an outer radial surface 208 of the lever housing 52. The rigid levers 204 pivot about a pivot point 210 located on the inner radial surface 58 of the lever housing 52. Both sets of rigid levers 202 and 204 include lever arms 214 and 216, respectively. The lever arms 214 and 216 are extensions or protrusions that contact the pivot points 206 and 210, respectively.

In addition, the torque transmitting device 200 includes a first return spring 220 and a second return spring 222. The first return spring 220 is disposed between the outer radial surface 208 of the lever housing 52 and the rigid levers 202. The first return spring 220 is operable to bias the rigid levers 202 to an unengaged position when the piston 114 is depressurized.

The second return spring 222 is disposed between a feature 224 on the inner surface 56 of the lever housing 52 and the rigid levers 204. The second return spring 222 is operable to bias the rigid levers 204 to an unengaged position when the piston 112 is depressurized.

Turning to FIGS. 6A and 6B, a schematic diagram of an alternate arrangement of the torque transmitting device 200 is generally indicated by reference number 200' and accordingly like components are indicated by like reference numbers. However, in the torque transmitting device 200', the return spring 222 is disposed between the rigid levers 204 and the inner radial surface 58 of the lever housing 52. The radial inner surface 58 includes a feature 224' that provides a space for the return spring 222 between the rigid lever 204 and the inner radial surface 58. The torque transmitting device 200' operates in substantially the same manner as the torque transmitting devices 10 and 200.

Turning now to FIGS. 7A and 7B, the return springs 220 and 222 will now be described. It should be appreciated that the return springs 220 and 222 are substantially identical, and therefore only return spring 220 will be described, it being understood that the return spring 222 includes similar features. The return spring 220 includes an annular portion 226 that is concentric with the lever housing 52 (see FIGS. 5B and 6B). A plurality of spring arms 228 are connected to the annular portion 226 and extend axially and radially inward. The spring arms 228 are disposed such that each spring arm 228 is in contact with a rigid lever 202. Each spring arm 228 includes a fastener 230 that couples a free end of the spring arm 228 to the rigid lever 202. In the example provided, the fastener 230 is a pin or bolt that connects through a hole (not shown) formed in the rigid lever 202. In an alternate embodiment shown in FIGS. 8A and 8B, the return spring 220 includes a fastener 230'. The fastener 230' is a c-shaped clip that is press fit around the rigid lever 202, thereby eliminating the need for machining a hole through the rigid levers 202.

Figure 9:
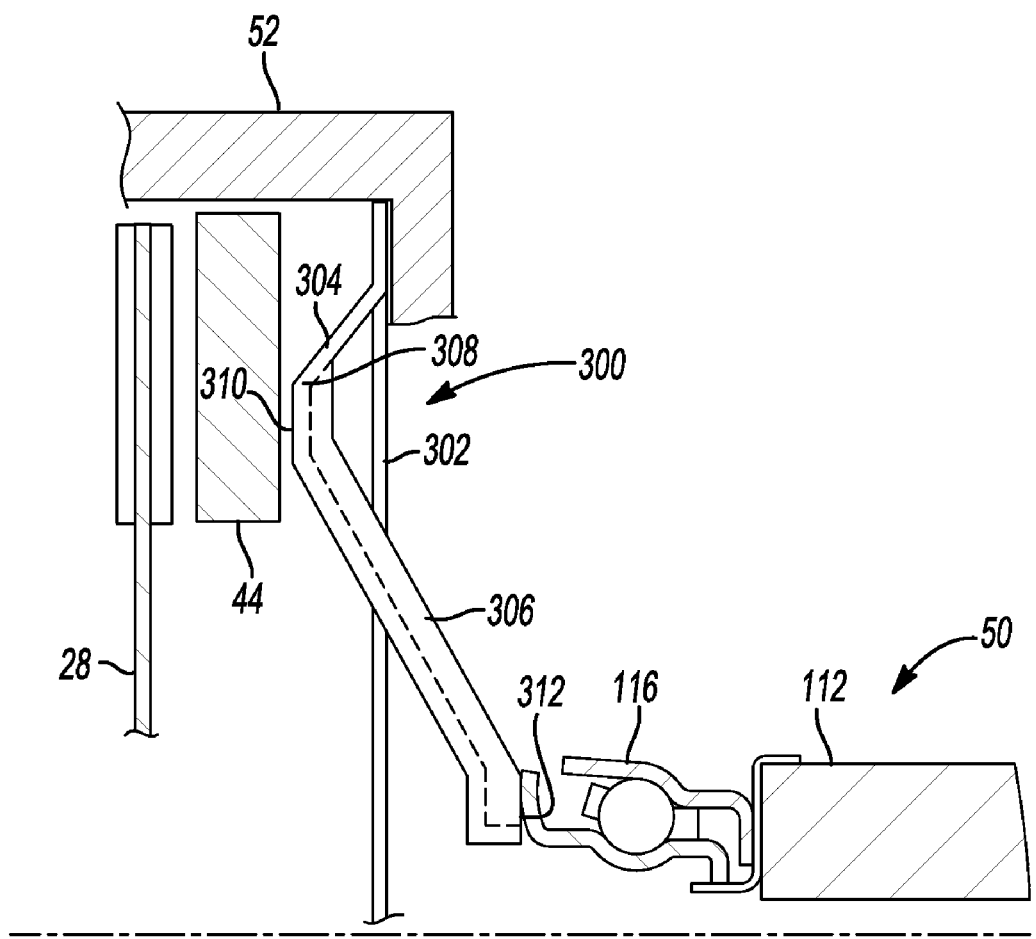
FIG. 9 is a side view of a portion of another embodiment of a retainer spring and lever arm according to the principles of the present invention.

Finally, with reference to FIG. 9, a hybrid return spring and rigid lever is indicated by reference number 300. The hybrid lever 300 includes an annular portion 302 that is concentric with the lever housing 52. A plurality of spring arms 304 (only one of which is shown) are connected to the annular portion 302 and extend axially and radially inward. Lever portions 306 are connected at ends 308 of each of the spring arms 304. The lever portions 308 have a thickness greater than a thickness of the spring arms 304. The lever portions 306 each include a contact surface 310 disposed at an end of the lever portions 306 proximate the spring arms 304. The lever portions 306 extend axially towards the actuator device 110 and radially inward, terminating in a second contact surface 312. When the piston 112 is depressurized, the spring arms 304 prevent the contact surfaces 310 from contacting and engaging the apply member 44. When the piston 112 is pressurized, the bearing 116 contacts the second apply surfaces 312 and bends the spring arms 304. Once the contact surfaces 310 contact the apply member 44, the lever portion 306 acts as a rigid lever between the contact surfaces 310 and 312, and the force transmitted by the bearing 116 is applied through the lever portion 306 to the apply member 44, thereby moving the apply member 44 to the engaged position and activating the clutch 22.

Rigid lever actuation of a torque transmitting device allows pressure control at the actuation point (i.e. the actuation device 110) to control the engagement of the clutches 20 and 22. The rigid lever reduces the variation between pressure commanded at the actuation device 110 and the force that is actually applied to the clutches 20 and 22 thereby providing more precise control. Rigid lever control increases the response time of the system by eliminating flexible springs or diaphragms that add dynamic delays to the system. In addition, the need for closed loop pressure control is eliminated, thereby allowing more robust control of the clutches 20 and 22.

The description of the invention is merely exemplary in nature and variations that do not depart from the gist of the invention are intended to be within the scope of the invention. Such variations are not to be regarded as a departure from the spirit and scope of the invention.

What is claimed is:

1. A dual clutch assembly comprising:
   a housing that defines an axis and includes an opening;
   an actuation member rotationally coupled with the housing;
   a first member coaxial with the housing;
   a second member coaxial with the first member;
   a first clutch having a first plate connected for common rotation with the actuation member and a second plate connected for common rotation with the first member;
   a second clutch having a first plate connected for common rotation with the housing and a second plate connected for common rotation with the second member;
   at least one first lever pivotally coupled to the housing, the first lever pivotable through the opening to contact the actuation member to move the actuation member and the first plate of the first clutch towards the second plate of the first clutch in order to engage the first clutch; and
   at least one second lever pivotally coupled to the housing, the second lever pivotable to contact the first plate of the second clutch to move the first plate of the second clutch towards the second plate of the second clutch in order to engage the second clutch.

2. The dual clutch assembly of claim 1 wherein the housing includes at least one first pivot point and at least one second pivot point, wherein the first lever pivots about the first pivot point and the second lever pivots about the second pivot point.

3. The dual clutch assembly of claim 2 wherein the first pivot point is disposed on an inner radial surface of the housing and the second pivot point is disposed on an inner axial surface of the housing.

4. The dual clutch assembly of claim 2 wherein the first pivot point is disposed on an outer radial surface of the housing and the second pivot point is disposed on an inner radial surface of the housing.

5. The dual clutch assembly of claim 4 further comprising a first return spring for moving the first lever to an unengaged position and a second return spring for moving the second lever to an unengaged position.

6. The dual clutch assembly of claim 5 wherein the first return spring is disposed between the outer radial surface of the housing and the first lever and wherein the second return spring is disposed between a projection extending from an axial inner surface of the housing and the second lever.

7. The dual clutch assembly of claim 5 wherein the first return spring is disposed between the outer radial surface of the housing and the first lever and wherein the second return spring is disposed between the inner radial surface of the housing and the second lever.

8. The dual clutch assembly of claim 5 wherein the first return spring includes a ring portion and at least one axially and radially inwardly extending spring arm, wherein the spring arm is coupled to the first lever, and wherein the second return spring includes a ring portion and at least one axially and radially inwardly extending spring arm, wherein the spring arm is coupled to the second lever.

9. The dual clutch assembly of claim 8 wherein the first return spring is coupled to the first lever by a pin connection.

10. The dual clutch assembly of claim 8 wherein the first return spring is coupled to the first lever by a clip connection.

11. The dual clutch assembly of claim 1 wherein the actuation member is disposed around the housing and wherein the actuation member is axially translatable relative to the housing.

12. The dual clutch assembly of claim 1 wherein the first lever includes a pivot portion pivotally connected to the housing, a first end located radially inwardly of the pivot portion, and a second end located radially outwardly of the pivot portion, and wherein the second end contacts the actuation member when the first lever is pivoted to an engaged position.

13. The dual clutch assembly of claim 12 wherein the second lever includes a pivot portion pivotally connected to the housing, a first end located radially inwardly of the pivot portion, and a contact surface disposed between the pivot portion and the first end, and wherein the contact surface contacts the first plate of the second clutch when the second lever is pivoted to an engaged position.

14. The dual clutch assembly of claim 13 wherein the first lever is pivoted to the engaged position by an actuation device in alignment with the first end of the first lever and the second lever is pivoted to the engaged position by an actuation device in alignment with the first end of the second lever.

15. The dual clutch assembly of claim 14 wherein the housing is annular and includes an axial inner surface that extends axially and a radial inner surface that extends radially inwardly, and wherein the radial inner surface includes the opening that is in alignment with the second end of the first lever.

16. The dual clutch assembly of claim 15 wherein the actuation member is a sleeve disposed around the housing, wherein the actuation member includes at least one radial member that extends radially inwardly and is disposed adjacent the opening in the housing, and wherein the second end of the first lever contacts the radial member of the actuation member when the first lever is pivoted to the engaged position, thereby slidably translating the actuation member in an axial direction and compressing the second friction plate of the first clutch with the first friction plate of the first clutch.

17. A dual clutch assembly for transferring torque between a crankshaft and a first input shaft and a second input shaft concentric with the first input shaft, the dual clutch assembly comprising:
   an outer hub rotationally connected with the crankshaft;
   a central hub rotationally connected with the outer hub, the central hub having a friction plate;
   a lever housing disposed coaxial with the crankshaft, the lever housing having a first end rotationally connected to the central hub and a second end;
   an actuation member disposed around the lever housing and having a first end and a second end, wherein the actuation member is rotationally coupled to the housing and axially translatable;
   a first clutch disposed adjacent the central hub and having an axially translatable apply member connected for common rotation with the first end of the actuation member and a friction member connected for common rotation with the first input shaft;
   a second clutch disposed adjacent the central hub and having an axially translatable apply member connected for common rotation with the first end of the lever housing and a friction member connected for common rotation with the second input shaft;

at least a first rigid lever pivotally coupled to the housing, the first rigid lever pivotable to an engaged position wherein the first rigid lever contacts the actuation member to move the actuation member and the apply member of the first clutch to compress the friction plate of the first clutch between the apply member of the first clutch and the friction plate of the central hub in order to engage the first clutch;

a spring connected to the first rigid lever to bias the first rigid lever to one of the engaged position or a disengaged position;

at least a second rigid lever pivotally coupled to the housing, the second rigid lever pivotable to an engaged position wherein the second rigid lever contacts the apply member of the second clutch to compress the friction plate of the second clutch between the apply member of the second clutch and the friction plate of the central hub in order to engage the second clutch; and an actuation device disposed adjacent the first and second rigid levers, the actuation device operable to selectively pivot the first and second rigid levers to the engaged positions when the actuation device is actuated.

18. The dual clutch assembly of claim 17 wherein the first rigid lever includes a ring portion where the spring extends radially inwardly and axially from the ring portion, and a lever portion connected with an end of the spring, wherein the lever portion extends radially inwardly and axially.

19. The dual clutch assembly of claim 18 wherein the lever portion contacts the apply member of the first clutch when the first rigid lever is pivoted by the actuation device and the spring biases the lever portion to disengage the first clutch when the actuation device is not actuated.

20. The dual clutch assembly of claim 17 wherein the first rigid lever includes a pivot portion pivotally connected to the lever housing, a first end located radially inwardly of the pivot portion, and a second end located radially outwardly of the pivot portion, wherein the actuation device contacts the first end of the first rigid lever when actuated and wherein the second end contacts the actuation member when the first rigid lever is pivoted to the engaged position by the actuation device.

21. The dual clutch assembly of claim 20 wherein the actuation member includes a radial surface at the second end that is substantially parallel to a radial surface at the second end of the lever housing, wherein the lever housing includes an opening in the radial surface of the lever housing, and wherein the second end of the first rigid lever engages the radial surface of the actuation member through the opening when the first rigid lever is moved to the engaged position.

22. The dual clutch assembly of claim 20 wherein the second rigid lever includes a pivot portion pivotally connected to the housing, a first end located radially inwardly of the pivot portion, and a contact surface disposed between the pivot portion and the first end, wherein the actuation device contacts the first end of the second rigid lever when actuated, and wherein the contact surface contacts the apply member of the second clutch when the second rigid lever is pivoted to an engaged position by the actuation device.

23. The dual clutch assembly of claim 22 wherein the housing is annular and includes an axial inner surface that extends axially and a radial inner surface that extends radially inwardly, and wherein the radial inner surface includes at least one opening that is in alignment with the second end of the first rigid lever.

24. The dual clutch assembly of claim 17 wherein the housing includes at least one first pivot point and at least one second pivot point, wherein the first rigid lever is pivotally coupled to the first pivot point and the second rigid lever is pivotally coupled to the second pivot point.

25. The dual clutch assembly of claim 24 wherein the first pivot point is disposed on an inner radial surface of the housing and the second pivot point is disposed on an inner axial surface of the housing.

* * * * *